(12) United States Patent
Walton et al.

(10) Patent No.: US 8,547,820 B2
(45) Date of Patent: Oct. 1, 2013

(54) ADAPTIVE PILOT INSERTION FOR A MIMO-OFDM SYSTEM

(75) Inventors: Jay Rodney Walton, Carlisle, MA (US); Mark S. Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/504,395

(22) Filed: Jul. 16, 2009

(65) Prior Publication Data
US 2010/0067590 A1    Mar. 18, 2010

Related U.S. Application Data

(62) Division of application No. 10/896,277, filed on Jul. 20, 2004, now Pat. No. 8,000,221.

(51) Int. Cl.
*H04L 27/28* (2006.01)
(52) U.S. Cl.
USPC .......................................... 370/208; 370/204
(58) Field of Classification Search
USPC ................. 370/200, 208, 328, 331, 343, 444, 370/210, 344; 455/522, 560, 192.2; 375/341, 375/343; 725/75
See application file for complete search history.

(56) References Cited

U.S. PATENT DOCUMENTS

| | | | |
|---|---|---|---|
| 3,636,524 A | 1/1972 | Holland | |
| 4,949,250 A | 8/1990 | Bhandarkar et al. | |
| 5,548,811 A * | 8/1996 | Kumagai et al. | 455/192.2 |
| 6,370,156 B2 | 4/2002 | Spruyt et al. | |
| 6,441,786 B1 | 8/2002 | Jasper et al. | |
| 6,445,693 B1 | 9/2002 | Sarraf et al. | |
| 6,490,265 B1 | 12/2002 | Sasaki et al. | |
| 6,539,211 B1 | 3/2003 | Abrishamkar et al. | |

(Continued)

FOREIGN PATENT DOCUMENTS

| | | |
|---|---|---|
| DE | 10141971 | 3/2003 |
| EP | 1083719 | 3/2001 |

(Continued)

OTHER PUBLICATIONS

IEEE Std 802.11a-1999; "Part 11: Wireless LAN Medium Access Control (MAC) and Physical Layer (PHY) specifications: High-Speed Physical Layer in the 5 GHZ Band" (Sep. 16, 1999).

(Continued)

*Primary Examiner* — Andrew Lai
*Assistant Examiner* — Zhiren Qin
(74) *Attorney, Agent, or Firm* — QUALCOMM IP Department; James Hunt Yancey, Jr.

(57) ABSTRACT

A transmitting entity transmits a "base" pilot in each protocol data unit (PDU). A receiving entity is able to derive a sufficiently accurate channel response estimate of a MIMO channel with the base pilot under nominal (or most) channel conditions. The transmitting entity selectively transmits an additional pilot if and as needed, e.g., based on channel conditions and/or other factors. The additional pilot may be adaptively inserted in almost any symbol period in the PDU. The receiving entity is able to derive an improved channel response estimate with the additional pilot. The transmitting entity sends signaling to indicate that additional pilot is being sent. This signaling may be embedded within pilot symbols sent on a set of pilot subbands used for a carrier pilot that is transmitted across most of the PDU. The signaling indicates whether additional pilot is being sent and possibly other pertinent information.

17 Claims, 7 Drawing Sheets

(56) References Cited

U.S. PATENT DOCUMENTS

| | | | |
|---|---|---|---|
| 6,567,387 B1 | 5/2003 | Dulin et al. | |
| 6,707,856 B1 | 3/2004 | Gardner et al. | |
| 7,039,412 B2 | 5/2006 | Sandhu et al. | |
| 7,065,060 B2 | 6/2006 | Yun et al. | |
| 7,145,959 B2 | 12/2006 | Harel et al. | |
| 7,310,304 B2 | 12/2007 | Mody et al. | |
| 7,406,104 B2 | 7/2008 | Yang et al. | |
| 8,000,221 B2 | 8/2011 | Walton et al. | |
| 2002/0059614 A1* | 5/2002 | Lipsanen et al. | 725/75 |
| 2002/0163879 A1* | 11/2002 | Li et al. | 370/200 |
| 2002/0181390 A1* | 12/2002 | Mody et al. | 370/208 |
| 2003/0072395 A1* | 4/2003 | Jia et al. | 375/341 |
| 2003/0174643 A1* | 9/2003 | Ro et al. | 370/210 |
| 2003/0214927 A1 | 11/2003 | Atarashi et al. | |
| 2004/0082356 A1* | 4/2004 | Walton et al. | 455/522 |
| 2004/0179492 A1* | 9/2004 | Zhang et al. | 370/331 |

FOREIGN PATENT DOCUMENTS

| | | |
|---|---|---|
| JP | 2000-504163 | 4/2000 |
| JP | 2000-511753 | 9/2000 |
| JP | 2004048716 A | 2/2004 |
| JP | 4690401 | 2/2011 |
| KR | 2003-0007481 | 1/2003 |
| WO | 03034646 | 4/2003 |
| WO | 2004038988 | 5/2004 |
| WO | WO 2004056022 | 7/2004 |
| WO | 2005018180 | 2/2005 |

OTHER PUBLICATIONS

International Search Report—PCT/US05/023979—International Search Authority, European Patent Office, Feb. 15, 2006.
Written Opinion—PCT/US05/023979—International Search Authority, European Patent Office, Feb. 15, 2006.
International Preliminary Report on Patentability—PCT/US05/023979—International Preliminary Examining Authority, European Patent Office, Nov. 16, 2006.
International Preliminary Examination Report—PCT/US05/023979—International Search Authority, US Patent Office, Jun. 13, 2007.
Partial International Search Report—PCT/US05/023979—International Search Authority, European Patent Office, Nov. 8, 2005.
European Search Report—EP11166524—Search Authority—Munich—Oct. 13, 2011.
Taiwan Search Report—TW094124357—TIPO—Jul. 12, 2011.
European Search Report—EP12153312—Search Authority—Munich—Apr. 10, 2012.

* cited by examiner

ADAPTIVE PILOT INSERTION FOR A MIMO-OFDM SYSTEM

CLAIM OF PRIORITY

This application is a divisional of, and claims the benefit of priority from, U.S. patent application Ser. No. 10/896,277 (now allowed), entitled "Adaptive Pilot Insertion for a MIMO-OFDM System" and filed Jul. 20, 2004, which is assigned to the assignee of this application and is fully incorporated herein by reference for all purposes.

BACKGROUND

1. Field

The present invention relates generally to communication, and more specifically to techniques for transmitting pilot and signaling in a multiple-input multiple-output (MIMO) communication system.

2. Background

A MIMO system employs multiple (T) transmit antennas at a transmitting entity and multiple (R) receive antennas at a receiving entity for data transmission. A MIMO channel formed by the T transmit antennas and R receive antennas may be decomposed into S spatial channels, where S≤min {T, R}. The S spatial channels may be used to transmit data in parallel to achieve higher throughput and/or redundantly to achieve greater reliability.

Orthogonal frequency division multiplexing (OFDM) is a multi-carrier modulation technique that effectively partitions the overall system bandwidth into multiple (K) orthogonal frequency subbands. These subbands are also referred to as tones, subcarriers, bins, and frequency channels. With OFDM, each subband is associated with a respective subcarrier that may be modulated with data. Up to K modulation symbols may be sent on the K subbands in each symbol period.

A MIMO-OFDM system is a MIMO system that utilizes OFDM. The MIMO-OFDM system has S spatial channels for each of the K subbands. Each spatial channel of each subband may be called a "transmission channel" and may be used to transmit one modulation symbol in each symbol period. Each transmission channel may experience various deleterious channel conditions such as, e.g., fading, multipath, and interference effects. The S·K transmission channels of the MIMO channel may also experience different channel conditions and may be associated with different complex gains and signal-to-noise-and-interference ratios (SNRs).

To achieve high performance, it is often necessary to characterize the MIMO channel. For example, the transmitting entity may need an estimate of the MIMO channel response to perform spatial processing (described below) in order to transmit data to the receiving entity. The receiving entity typically needs an estimate of the MIMO channel response to perform receiver spatial processing on signals received from the transmitting entity in order to recover the transmitted data.

The transmitting entity normally transmits a pilot to assist the receiving entity in performing a number of functions. The pilot is typically composed of known modulation symbols that are transmitted in a known manner. The receiving entity may use the pilot for channel estimation, timing and frequency acquisition, data detection, and so on. Since the pilot represents overhead in the system, it is desirable to minimize the amount of system resources used to transmit the pilot. The system may thus employ a pilot structure that provides an adequate amount of pilot for most receiving entities under normal (or most) channel conditions. However, this pilot structure may be inadequate for certain receiving entities observing adverse channel conditions.

There is therefore a need in the art for techniques to transmit pilot for various channel conditions.

SUMMARY

Techniques to adaptively and flexibly transmit additional pilot, e.g., based on channel conditions and/or other factors, in order to achieve good performance are described herein. A transmitting entity transmits a "base" pilot in each protocol data unit (PDU). A receiving entity is able to derive a sufficiently accurate channel response estimate of a MIMO channel between the transmitting and receiving entities with the base pilot under nominal (or most) channel conditions. The transmitting entity selectively transmits an additional pilot if and as needed, e.g., based on the channel conditions and/or other factors. The additional pilot may be adaptively inserted in any symbol period in the PDU, except for symbol periods with other designated transmissions. The receiving entity is able to derive an improved channel response estimate with the additional pilot. The base pilot represents a fixed overhead and is selected to provide good performance under nominal (or most) channel conditions. The additional pilot may be sent when needed and may provide good performance for adverse channel conditions, without having to incur a fixed and high overhead for the pilot.

The transmitting entity sends signaling to indicate that additional pilot is being sent. This signaling may be conveniently embedded within a carrier pilot that is transmitted on a designated set of P subbands across most of the PDU (e.g., P=4). A set of P pilot symbols is sent on the set of P subbands in each symbol period in which the carrier pilot is transmitted. Different sets of P pilot symbols may be formed for different signaling values, e.g., one signaling value to indicate that data symbols are being transmitted on the remaining usable subbands, another signaling value to indicate that additional pilot symbols are being transmitted, and so on. The signaling for the additional pilot may be sent by selecting the proper set of P pilot symbols and sending these P pilot symbols on the P subbands used for the carrier pilot. The additional pilot and its signaling may thus be selectively and concurrently sent in almost any symbol period in the PDU. The signaling for the additional pilot may also be sent in some other manners.

Various aspects and embodiments of the invention are described in further detail below.

BRIEF DESCRIPTION OF THE DRAWINGS

FIG. 1 shows an OFDM subband structure used by IEEE 802.11a;

DETAILED DESCRIPTION

The word "exemplary" is used herein to mean "serving as an example, instance, or illustration." Any embodiment described herein as "exemplary" is not necessarily to be construed as preferred or advantageous over other embodiments.

The pilot transmission and signaling techniques described herein may be used for a single-input single-output (SISO) system, a single-input multiple-output (SIMO) system, a multiple-input single-output (MISO) system, and a MIMO system. These techniques may be used for an OFDM-based system and for other multi-carrier communication systems. These techniques may also be used with various OFDM subband structures. For clarity, these techniques are specifically described below for a MIMO-OFDM system utilizing the OFDM subband structure defined by IEEE 802.11a.

The IEEE 802.11 OFDM subband structure partitions the overall system bandwidth into 64 orthogonal subbands (i.e., K=64), which are assigned indices of −32 to +31. Of these 64 subbands, 48 subbands with indices of ±{1, ..., 6, 8, ..., 20, 22, ..., 26} may be used for data and pilot transmission and are called "data" subbands, 4 subbands with indices of ±{7, 21} may be used for a carrier pilot and possibly signaling and are called "pilot" subbands, the DC subband with index of 0 is not used, and the 11 remaining subbands are also not used and serve as guard subbands. Thus, the 64 total subbands include 52 "usable" subbands composed of the 48 data subbands and the 4 pilot subbands and 12 "unused" subbands. This OFDM subband structure is described in a document for IEEE Standard 802.11a entitled "Part 11: Wireless LAN Medium Access Control (MAC) and Physical Layer (PHY) Specifications: High-speed Physical Layer in the 5 GHz Band," September 1999, which is publicly available. In general, an OFDM-based system may utilize any OFDM subband structure with any number of data, pilot, and guard subbands.

Figure 1:
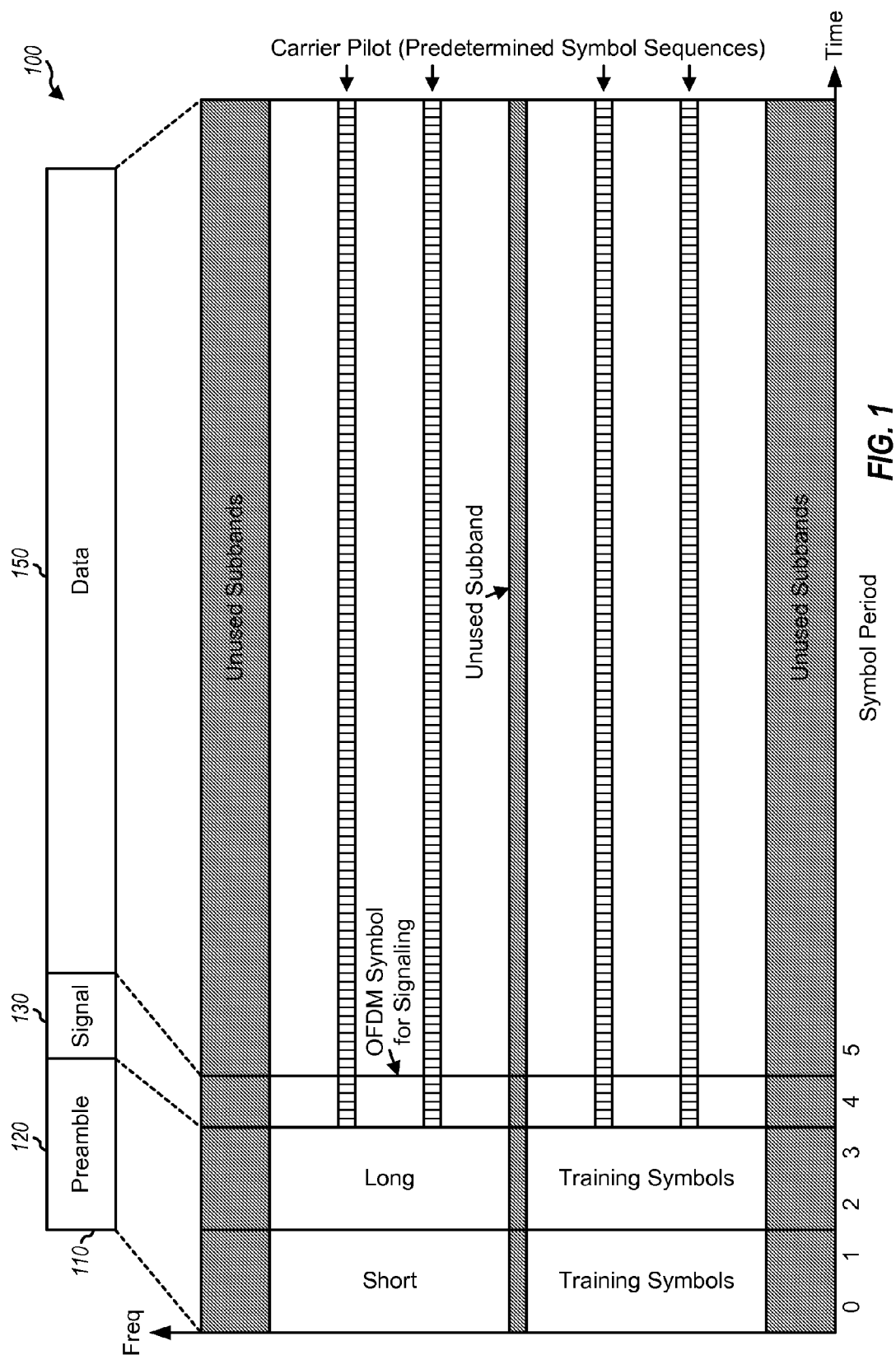

FIG. 1 shows a PDU format 100 defined by IEEE 802.11 and suitable for use for various communication systems. At a physical (PHY) layer in the protocol stack for IEEE 802.11, data is processed and transmitted in PHY protocol data units (PPDUs), which are also called "PDUs" herein for simplicity. Each PDU 110 for IEEE 802.11 includes a preamble section 120, a signal section 130, and a data section 150. Preamble section 120 carries short and long training symbols that are described below. Signal section 130 carries one OFDM symbol for signaling for the PDU. Data section 150 carries a variable number of OFDM symbols for traffic/packet data for the PDU. The length of data section 150 is indicated by the signaling in signal section 130.

Preamble section 120 carries ten short training symbols sent in two OFDM symbol periods followed by two long training symbols sent in two OFDM symbol periods. Four short training symbols are formed by performing an inverse discrete Fourier transform (IDFT) on a specific set of 12 pilot symbols sent on 12 subbands with indices of {−24, −20, −16, −12, −8, −4, 4, 8, 12, 16, 20, and 24}. A "pilot symbol" is a modulation symbol for pilot and is typically known a priori by both the transmitting and receiving entities. The same set of 12 pilot symbols is used for all short training symbols. Each long training symbol is formed by performing an IDFT on a specific set of 52 pilot symbols sent on the 52 usable subbands. The same set of 52 pilot symbols is also used for both long training symbols. A receiving entity may use the short training symbols for signal detection, coarse frequency offset estimation, timing synchronization, automatic gain control (AGC), and so on. The receiving entity may use the long training symbols for channel estimation, fine frequency offset estimation, and so on.

Signaling and data are sent on the 48 data subbands in signal section 130 and data section 150, respectively. A carrier pilot is sent on the four pilot subbands in the signal and data sections. The carrier pilot is composed of four pilot symbols that are sent on the four pilot subbands across the signal and data sections. Prior to transmission, the pilot symbol for each pilot subband is multiplied with a 127-chip circularly extended pseudo-random number (PN) sequence to generate a predetermined symbol sequence for that pilot subband. The receiving entity may use the carrier pilot to track the phase of a carrier signal across the signal and data sections.

The pilot structure shown in FIG. 1 comprises ten short training symbols, two long training symbols, and the carrier pilot. This pilot structure is generally suitable for a SISO system.

A MIMO system may utilize different types of pilot to support various functions needed for proper system operation, such as timing and frequency acquisition, channel estimation, calibration, and so on. Table 1 lists four types of pilot and their short description. A pilot is also called a "reference", and these two terms are often used interchangeably.

TABLE 1

Pilot Types

| Pilot Type | Description |
| --- | --- |
| Beacon Pilot | A pilot transmitted from all transmit antennas and used for timing and frequency acquisition. |
| Unsteered MIMO Pilot | A pilot transmitted from all transmit antennas and used for channel estimation, with the pilot transmission from each transmit antenna being identifiable by a receiving entity. |
| Steered MIMO Pilot | A pilot transmitted on "eigenmodes" of a MIMO channel and used for channel estimation and possibly rate control. |
| Carrier Pilot | A pilot used for phase tracking of a carrier signal. |

The unsteered and steered MIMO pilots are described in detail below.

Figure 2:
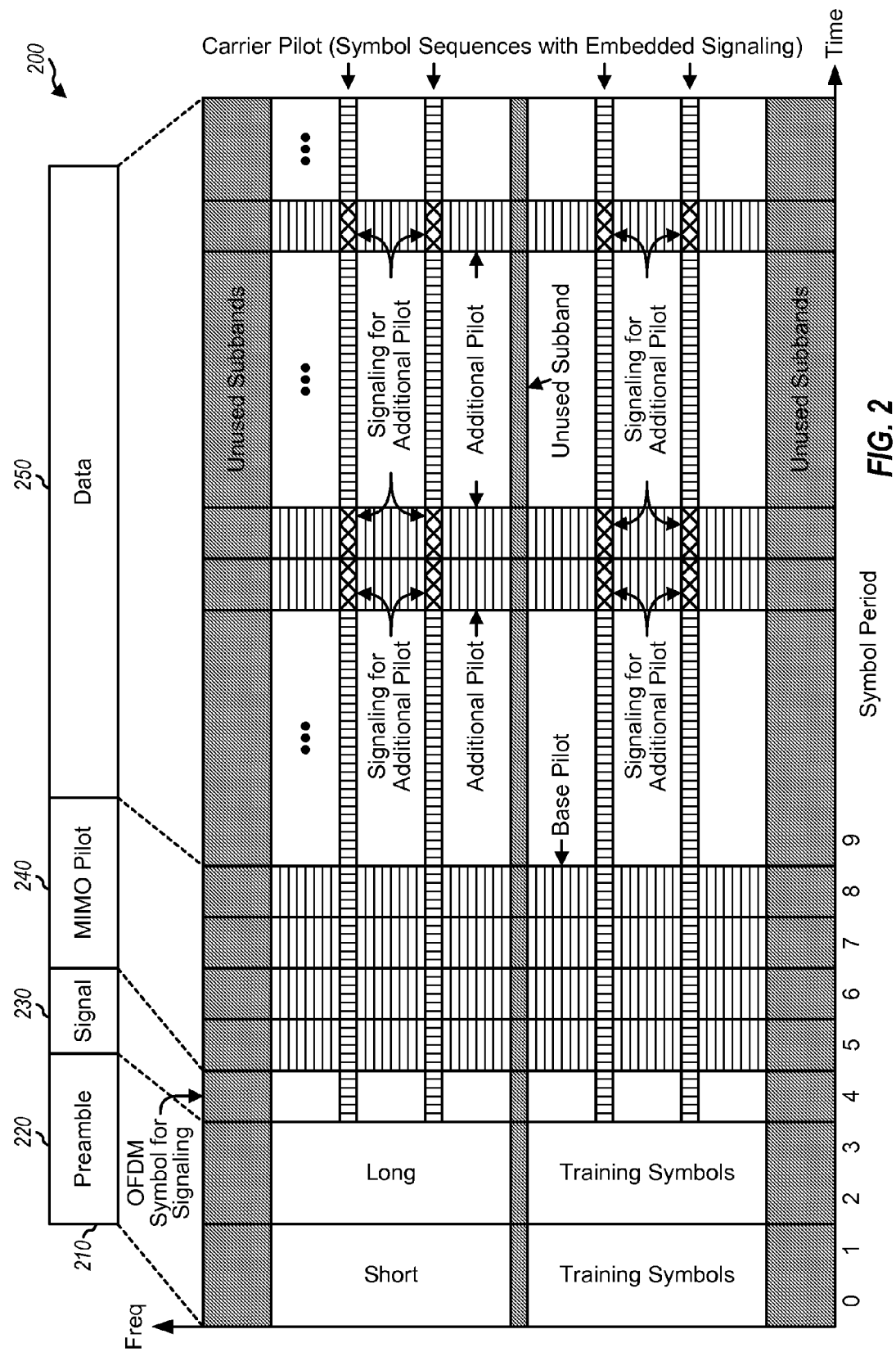
FIG. 2 shows an exemplary PDU format suitable for a MIMO system.

FIG. 2 shows an exemplary PDU format 200 suitable for the MIMO system. A PDU 210 for this format includes a preamble section 220, a signal section 230, a MIMO pilot section 240, and a data section 250. Preamble section 220 carries the beacon pilot. For the embodiment shown in FIG. 2, the beacon pilot is composed of ten short training symbols and two long training symbols. Preamble section 220 is thus similar to preamble section 120 in FIG. 1. Signal section 230 carries signaling for PDU 210 and may include (1) a field that indicates whether the PDU has format 200 or some other format (e.g., format 100) and (2) a field that indicates the length of MIMO pilot section 240. MIMO pilot section 240 carries a "base" MIMO pilot, which may be unsteered or steered. The base MIMO pilot is typically sent in each PDU and may be transmitted in the same manner as the data in the PDU. Data section 250 carries the data for PDU 210. A carrier pilot is sent on the four pilot subbands in signal section 230, MIMO pilot section 240, and data section 250. A PDU may also be called a packet, a data unit, a frame, a slot, a block, or some other terminology.

PDU format 200 includes an exemplary pilot structure for the MIMO system. To minimize overhead, the pilot structure may include a minimal (or nominal) amount of pilot (the base pilot) needed for proper system operation under normal channel conditions. For example, MIMO pilot section 240 may carry T OFDM symbols for the MIMO pilot for T transmit antennas. Additional pilot may be adaptively inserted and sent if and as needed in order to achieve improved performance. The additional pilot may be beneficial under certain adverse channel conditions such as increased fade rates due to Doppler effect, changing interference and/or jamming characteristics, and so on. The additional pilot may also be sent based on other factors, e.g., if the PDU is for a retransmission because an acknowledgment (ACK) was not received for a prior transmission of the PDU. The additional pilot may be inserted in the data section of the PDU. Signaling to indicate transmission of the additional pilot may be efficiently embedded within the carrier pilot, as described below, or sent in signal section 230.

A MIMO channel between a transmitting entity and a receiving entity may be characterized by an R×T channel response matrix H(k) for each subband k, which may be expressed as:

$$\underline{H}(k) = \begin{bmatrix} h_{1,1}(k) & h_{1,2}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix}, \text{ for } k = 1 \ldots K, \quad \text{Eq. (1)}$$

where entry $h_{i,j}(k)$, for i=1 . . . R and j=1 T, denotes the coupling or complex channel gain between transmit antenna j and receive antenna i for subband k. For simplicity, the MIMO channel is assumed to be full rank with S=T≤R.

The receiving entity may obtain an estimate of H(k) for each subband k based on an unsteered MIMO pilot sent by the transmitting entity. The unsteered MIMO pilot comprises T pilot transmissions sent from T transmit antennas, where the pilot transmission from each transmit antenna is identifiable by the receiving entity. This may be achieved by sending the pilot transmission for each transmit antenna with a different orthogonal (e.g., Walsh) sequence using code multiplexing, on a different subband using subband multiplexing, in a different symbol period using time multiplexing, and so on. An unsteered MIMO pilot sent using code multiplexing may be expressed as:

$$x_{pilot}{}^u(k,n)=W(n)\cdot p(k,n), \text{ for } k \in K_u, \quad \text{Eq. (2)}$$

where p(k,n) is a vector of T pilot symbols to be sent from the T transmit antennas on subband k in symbol period n;

W(n) is a diagonal Walsh matrix for the T transmit antennas in symbol period n;

$x_{pilot}{}^u(k,n)$ is a vector of transmit symbols for the unsteered MIMO pilot for subband k in symbol period n; and $K_u$ is a set of subbands on which the unsteered MIMO pilot is sent.

A "transmit symbol" is a symbol to be sent from a transmit antenna. The same Walsh matrix W(n) may be used for all subbands and may thus not be a function of subband index k.

As an example, if T=4, then the four transmit antennas may be assigned four Walsh sequences of $W_1=\{1, 1, 1, 1\}$, $W_2=\{1, -1, 1, -1\}$, $W_3=\{1, 1, -1, -1\}$, and $W_4=\{1, -1, -1, 1\}$. Walsh matrix W(1) then contains the first element of the four Walsh sequences along its diagonal, W(2) contains the second element of the four Walsh sequences, W(3) contains the third element of the four Walsh sequences, and W(4) contains the fourth element of the four Walsh sequences. The four Walsh matrices W(1) through W(4) may be used in four symbol periods to transmit the unsteered MIMO pilot. In general, a complete unsteered MIMO pilot may be sent in T (consecutive or non-consecutive) symbol periods with code multiplexing, or one symbol period for each chip of the orthogonal sequence. Upon receiving the complete unsteered MIMO pilot, the receiving entity may perform the complementary processing on the received pilot to estimate H(k).

The transmitting entity may transmit data on S eigenmodes of the channel response matrix H(k) for each subband k to achieve improved performance. The channel response matrix H(k) for each subband k may be "diagonalized" to obtain the S eigenmodes of the MIMO channel for that subband. This diagonalization may be achieved by performing either singular value decomposition of H(k) or eigenvalue decomposition of a correlation matrix of H(k), which is $R(k)=H^H(k)\cdot H(k)$, where $H^H$/denotes the conjugate transpose of H. The singular value decomposition of H(k) may be expressed as:

$$H(k)=U(k)\cdot\Sigma(k)\cdot V^H(k), \quad \text{Eq. (3)}$$

where U(k) is an R×R unitary matrix of left eigenvectors of H(k);

Σ(k) is an R×T diagonal matrix of singular values of H(k); and

V(k) is a T×T unitary matrix of right eigenvectors of H(k).

A unitary matrix M is characterized by the property $M^H M=I$, where I is the identity matrix. The columns of a unitary matrix are orthogonal to one another. The transmitting entity may use the right eigenvectors in V(k) for spatial processing to transmit data on the S eigenmodes of H(k). The receiving entity may use the left eigenvectors in U(k) for receiver spatial processing to recover the data transmitted on the S eigenmodes of H(k). The diagonal matrix Σ(k) contains non-negative real values along the diagonal and zeros elsewhere. These diagonal entries are referred to as singular values of H(k) and represent the channel gains for the S eigenmodes of H(k). Singular value decomposition is described by Gilbert Strang in "Linear Algebra and Its Applications," Second Edition, Academic Press, 1980.

The transmitting entity may transmit a steered MIMO pilot as follows:

$$x_{pilot,m}{}^s(k)=v_m(k)\cdot p_m(k), \text{ for } k \in K_s, \quad \text{Eq. (4)}$$

where $v_m(k)$ is the m-th eigenvector/column of V(k);

$p_m(k)$ is a pilot symbol to be transmitted on the m-th eigenmode of H(k);

$x_{pilot,m}{}^s(k)$ is a transmit vector for the steered MIMO pilot for the m-th eigenmode of H(k); and $K_s$ is a set of subbands on which the steered MIMO pilot is sent.

The received steered MIMO pilot at the receiving entity may be expressed as:

$$\begin{aligned}\underline{r}^s_{pilot,m}(k) &= \underline{H}(k)\cdot \underline{x}^s_{pilot,m}(k) + \underline{n}(k), \quad \text{Eq. (5)}\\ &= \underline{U}(k)\cdot\underline{\Sigma}(k)\cdot\underline{V}^H(k)\cdot\underline{v}_m(k)\cdot p_m(k) + \underline{n}(k),\\ &\text{for } k \in K_s,\\ &= \underline{u}_m(k)\cdot\sigma_m(k)\cdot p_m(k) + \underline{n}(k),\end{aligned}$$

where $r_{pilot}{}^s(k)$ is a vector of received symbols for the steered MIMO pilot for the m-th eigenmode of H(k);

$\sigma_m(k)$ is the m-th diagonal element of Σ(k); and $u_m(k)$ is the m-th eigenvector/column of U(k).

A "received symbol" is a symbol obtained from a receive antenna. The transmitting entity may transmit a complete steered MIMO pilot on all S eigenmodes of H(k) in S symbol periods, e.g., on one eigenmode per symbol period using time multiplexing as shown in equation (4). The receiving entity may obtain an estimate of U(k), one column at a time, based on the steered MIMO pilot sent using time multiplexing, as shown in equation (5).

The transmitting entity may also transmit the steered MIMO pilot on all S eigenmodes of H(k) concurrently in S symbol periods using coding multiplexing. The steered MIMO pilot with code multiplexing may be expressed as:

$$x_{pilot}^s(k,n) = V(k,n) \cdot W(n) \cdot p(k,n), \text{ for } k \in K_s, \quad \text{Eq. (6)}$$

where V(k,n) is a matrix of right eigenvectors of H(k,n) for subband k in symbol period n. The receiving entity may obtain an estimate of U(k,n) after receiving the complete steered MIMO pilot.

The transmitting entity may also transmit the complete steered MIMO pilot for all S eigenmodes of H(k) on S subbands k through k+S−1 in one symbol period using subband multiplexing. The transmitting entity may also transmit the steered MIMO pilot on less than S eigenmodes. For example, the transmitting entity may transmit the steered MIMO pilot on the best or principal eigenmode in one symbol period, on the two best eigenmodes in two symbol periods, and so on.

In general, the transmitting entity may transmit the unsteered and steered MIMO pilots in various manners using code, subband, and/or time multiplexing. Code multiplexing allows the transmitting entity to use the maximum transmit power available for each transmit antenna for pilot transmission, which may improve channel estimation performance.

The additional pilot may be a MIMO pilot, as described above. The additional pilot may also be some other type of pilot. For example, the transmitting entity may transmit a single stream of pilot symbols on a single eigenmode or may beam steer a single stream of pilot symbols in some other manner. This additional pilot may be used, for example, to drive the timing offset, correct residual frequency offset, and so on.

The pilot structure includes the base pilot (e.g., MIMO pilot section 240 in FIG. 2) that provides good performance under nominal channel conditions. This results in low overhead for the pilot. Additional pilot may be transmitted if and as needed. The amount of additional pilot to be sent as well as the placement of the additional pilot within a PDU may be flexibly selected based on the channel conditions and/or other factors. For example, a larger amount of additional pilot may be sent under more severe channel conditions. The additional pilot may be sent at or near the start of a PDU, which may simplify channel estimation and data detection and may further reduce buffering requirement. The additional pilot may also be dispersed throughout a PDU, which may improve performance for a time-varying channel.

Referring to FIG. 2, four pilot symbols may be sent on the four pilot subbands in each symbol period in data section 250. These pilot symbols may be used to indicate/signal the content being sent on the 48 data subbands. If each pilot symbol is formed with B bits, then up to $2^{4B}$ different signaling values may be defined with the four pilot symbols sent on the four pilot subbands. For example, using binary phase shift keying (BPSK), each pilot symbol is formed with one bit, and up to $2^4 = 16$ different signaling values may be defined with the four pilot symbols.

In general, detection performance for the signaling embedded in the four pilot symbols degrades in proportion to the number of signaling values defined for these pilot symbols. The receiving entity receives noisy versions of the four pilot symbols and needs to ascertain the specific signaling value sent by the transmitting entity based on these noisy received pilot symbols. The receiving entity may compute a metric (e.g., a distance) between the received pilot symbols and the set of pilot symbols for each valid signaling value. The receiving entity then selects the signaling value with the best metric (e.g., the shortest distance) as the value sent by the transmitting entity. Detection error is more likely when there are more valid signaling values from which to choose.

In an embodiment, the four pilot symbols are used to indicate whether data or additional pilot is being sent in the OFDM symbol. Table 2 shows an exemplary signaling set for this embodiment with four bits $b_1$, $b_2$, $b_3$, and $b_4$ carried by the four pilot symbols with BPSK.

TABLE 2

| Bits | Value | Definition |
|---|---|---|
| $b_1 b_2 b_3 b_4$ | '0000' | Data is being sent in the OFDM symbol |
| | '1111' | MIMO pilot is being sent in the OFDM symbol |

The additional MIMO pilot may be steered or unsteered, e.g., may be sent in the same manner as data symbols in the PDU. A "data symbol" is a modulation symbol for data.

In another embodiment, the 4B bits are used to indicate whether additional pilot is being sent in the OFDM symbol and, if yes, specific information for the additional pilot. Table 3 shows an exemplary signaling set for this embodiment with four bits $b_1$, $b_2$, $b_3$, and $b_4$ carried by the four pilot symbols with BPSK.

TABLE 3

| Bits | Value | Definition |
|---|---|---|
| $b_1 b_2$ | '00' | Data is being sent in the OFDM symbol |
| | '01' | Steered MIMO pilot is being sent in the OFDM symbol |
| | '10' | Unsteered MIMO pilot is being sent in the OFDM symbol |
| | '11' | Reserved |
| $b_3$ | '0' | Additional pilot is being sent with code multiplexing |
| | '1' | Additional pilot is being sent with subband multiplexing |
| $b_4$ | '0' | Additional pilot is being sent on 48 data subbands |
| | '1' | Additional pilot is being sent on 24 data subbands |

For the embodiment shown in Table 3, bits $b_1$ and $b_2$ indicate whether an unsteered MIMO pilot, a steered MIMO pilot, or no additional pilot is being sent in the OFDM symbol. Bit $b_3$ indicates whether the MIMO pilot is being sent using code/time multiplexing or subband multiplexing. For code multiplexing, the MIMO pilot is sent over multiple symbol periods using orthogonal sequences. For example, an unsteered MIMO pilot may be sent from four transmit antennas in four symbol periods using 4-chip Walsh sequences, as shown in equation (2). A steered MIMO pilot may be sent on all four eigenmodes concurrently in four symbol periods using 4-chip Walsh sequences, as shown in equation (6). For subband multiplexing, the MIMO pilot is sent on multiple subbands in one symbol period. For example, an unsteered MIMO pilot may be sent from four transmit antennas on four different subbands in one symbol period (e.g., from transmit antenna 1 on subband k, from transmit antenna 2 on subband k+1, from transmit antenna 3 on subband k+2, and from transmit antenna 4 on subband k+3). A steered MIMO pilot may be sent on four eigenmodes using four different subbands in one symbol period (e.g., on eigenmode 1 using subband k, on eigenmode 2 using subband k+1, on eigenmode 3 using subband k+2, and on eigenmode 4 using subband k+3). Bit $b_4$ indicates the number of subbands used for the additional pilot. For example, additional pilot symbols may be sent on all 48 data subbands or on only 24 data subbands (e.g., every other data subband).

Tables 2 and 3 show two specific embodiments of the signaling embedded in the four pilot subbands with four bits using BPSK. In general, the 4B bits for the carrier pilot may be used to convey any type of information for the additional pilot such as (1) whether or not the additional pilot is being sent, (2) the type of additional pilot being sent (e.g., unsteered MIMO pilot, steered MIMO pilot, and so on), (3) the manner in which the pilot is being sent (e.g., code multiplexing, subband multiplexing, time multiplexing, and so on), (4) the number of subbands used for the additional pilot (e.g., all, half, quarter, or some other number of data subbands), and (5) possibly other pertinent information. More signaling values provide more flexibility in the transmission of the additional pilot. However, detection performance is also worse with more signaling values. A tradeoff may be made between detection performance and pilot insertion flexibility.

The signaling for the additional pilot in a given PDU may also be sent in signal section 230 of the PDU. This signaling may indicate any or all of the possible information noted above for the additional pilot. Furthermore, this signaling may indicate the specific symbol periods in which the additional pilot will be sent (e.g., in the middle of data section 250, in every quarter of the data section, in every L-th symbol period, and so on).

The carrier pilot may be used to send signaling for the additional pilot, as described above. The carrier pilot may also be used to send other types of signaling such as, for example, the rate (e.g., coding and modulation scheme) used for a PDU being sent, the rate to be used for the other link (e.g., downlink or uplink), power control information (e.g., UP and DOWN power control commands used to adjust transmit power), transmission parameters (e.g., the allocated traffic channels, frequency subbands, and so on), an acknowledgment (ACK) or a negative acknowledgment (NAK) for a PDU received via the other link, a set of base station(s) to use for communication, and so on. Different types of signaling may have different reliability requirements and may employ different encoding schemes and/or different signaling sets. Regardless of the type of signaling to be sent, the transmitting entity may conveniently send this signaling on the pilot subbands, and the receiving entity may quickly detect this signaling.

Figure 3:
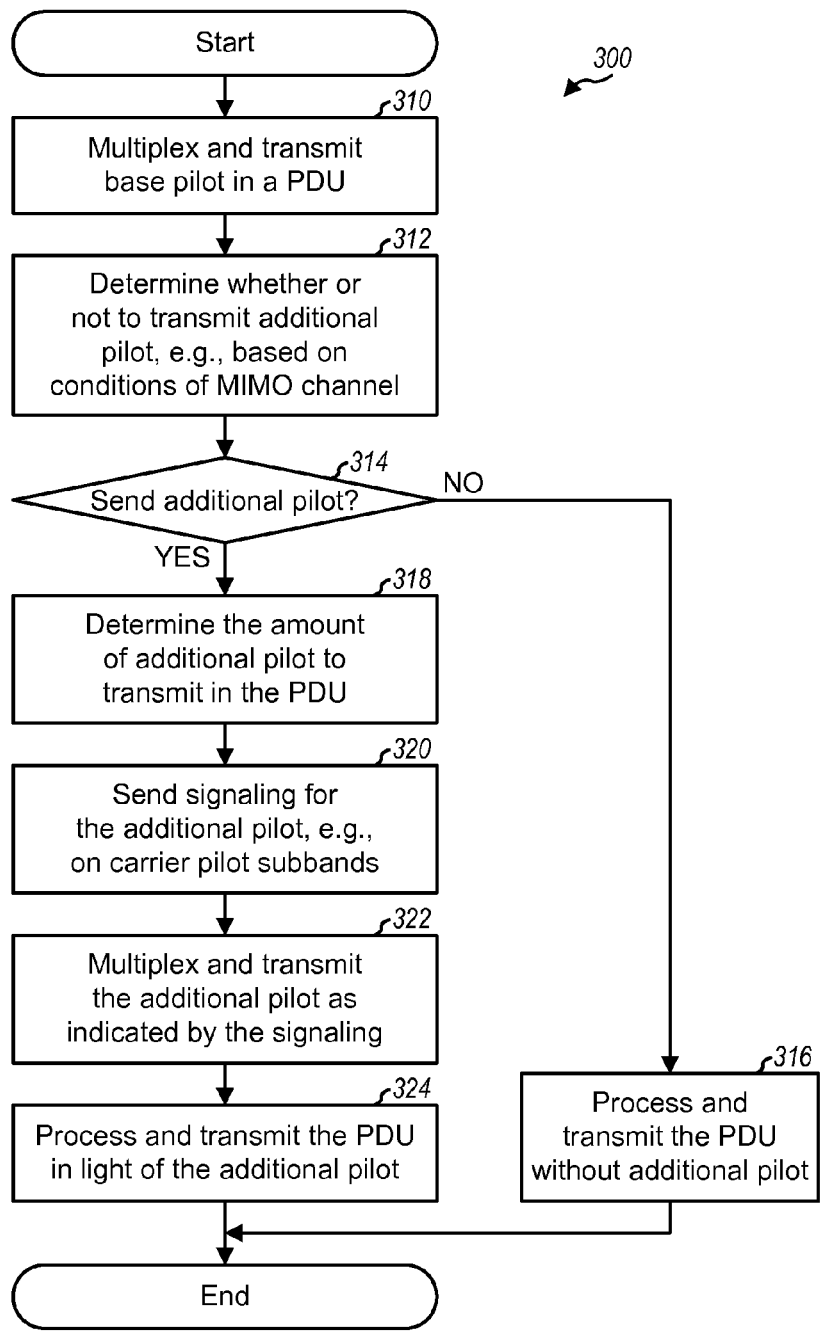
FIG. 3 shows a process to transmit an additional pilot.

FIG. 3 shows a flow diagram of a process 300 performed by the transmitting entity to send additional pilot. Process 300 may be performed for each PDU. The transmitting entity multiplexes and transmits the base pilot in the PDU (block 310). The transmitting entity also determines whether or not to transmit additional pilot in the PDU, e.g., based on channel conditions and/or other factors (block 312). If additional pilot is not to be sent in the PDU, as determined in block 314, then the transmitting entity processes and transmits the PDU in the normal manner without any additional pilot (block 316). Otherwise, if additional pilot is to be sent, then the transmitting entity determines the amount, type, location, and so on, of the additional pilot to be sent in the PDU, e.g., based on the channel conditions and/or other factors (block 318). The transmitting entity then sends signaling for the additional pilot in the PDU, e.g., embedded in the pilot symbols sent on the four pilot subbands (block 320). The transmitting entity also multiplexes and transmits the additional pilot as indicated by the signaling (block 322). The transmitting entity also processes and transmits the PDU in light of the additional pilot (block 324). For example, the length of the PDU may be extended by the amount of additional pilot being sent in the PDU.

Figure 4:
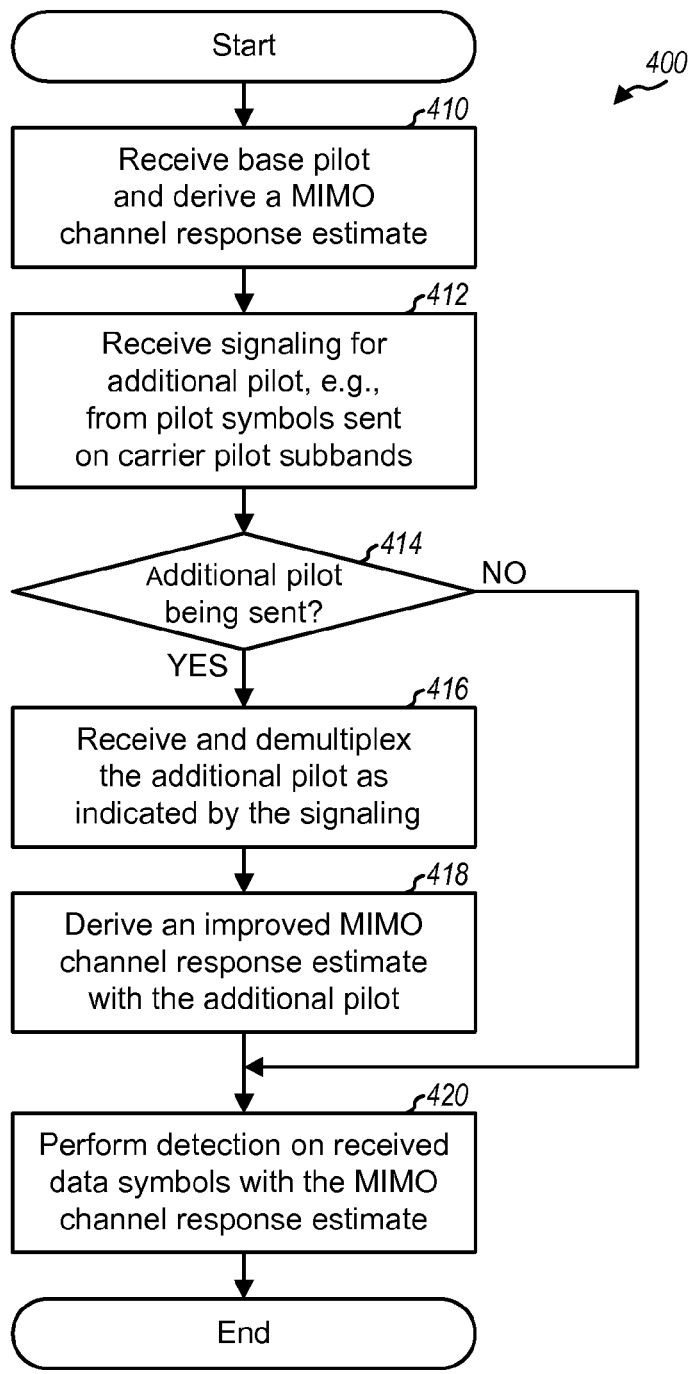
FIG. 4 shows a process to receive and utilize the additional pilot.

FIG. 4 shows a flow diagram of a process 400 performed by the receiving entity to receive and utilize the additional pilot. Process 400 may also be performed for each PDU. The receiving entity receives the base pilot (e.g., the MIMO pilot sent in MIMO pilot section 240) and derives a MIMO channel response estimate based on the received base pilot (block 410). The receiving entity receives signaling for the additional pilot, e.g., from the pilot symbols sent on the four pilot subbands (block 412). The receiving entity determines whether or not additional pilot is being sent based on the received signaling (block 414). If additional pilot is not being sent, then the process proceeds to block 420. Otherwise, the receiving entity receives and demultiplexes the additional pilot as indicated by the received signaling (block 416). The receiving entity then derives an improved MIMO channel response estimate with the additional pilot (block 418). The receiving entity uses the channel response estimate to perform data detection on received data symbols for the PDU (block 420).

Figure 5:
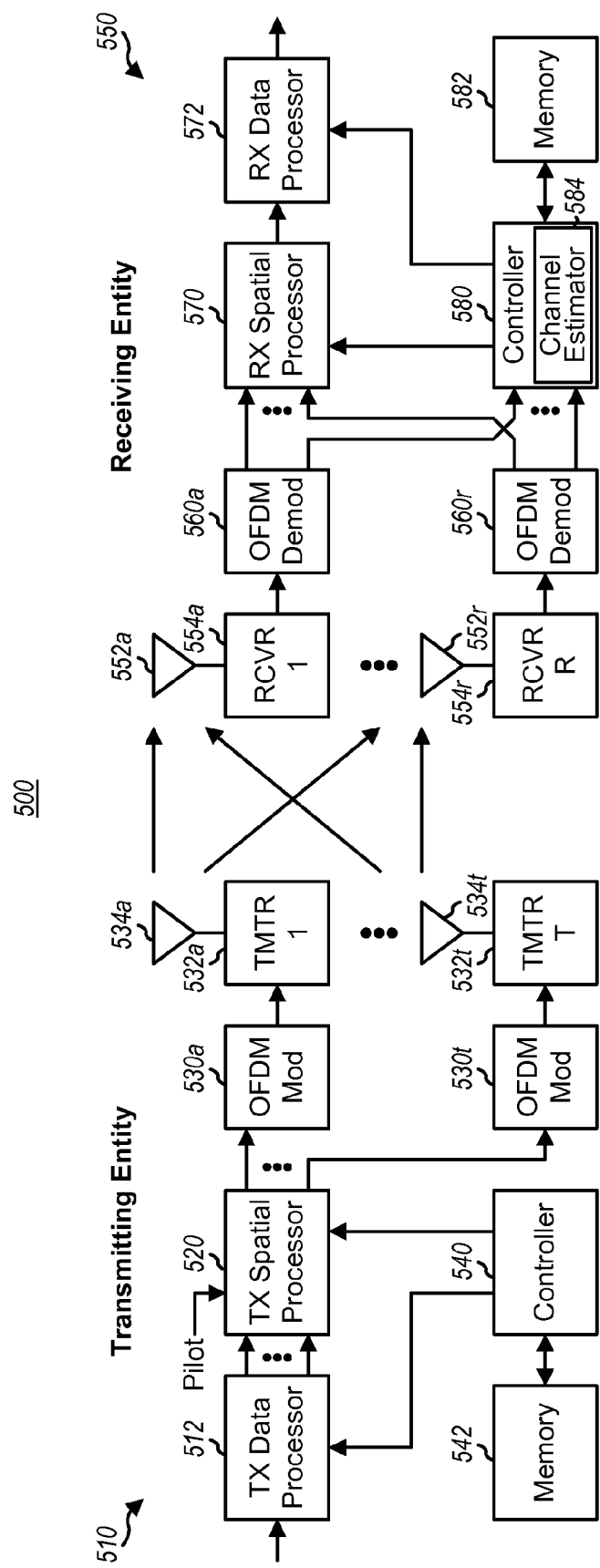
FIG. 5 shows a block diagram of a transmitting entity and a receiving entity.

FIG. 5 shows a block diagram of a transmitting entity 510 and a receiving entity 550 in a MIMO system 500. Transmitting entity 510 may be an access point or a user terminal Receiving entity 550 may also be an access point or a user terminal.

At transmitting entity 510, a TX data processor 512 processes (e.g., encodes, interleaves, and symbol maps) traffic/packet data to obtain data symbols. A TX spatial processor 520 receives and demultiplexes pilot and data symbols onto the proper subbands, performs spatial processing as appropriate, and provides T streams of transmit symbols for the T transmit antennas to T OFDM modulators (Mod) 530*a* through 530*t*. Each OFDM modulator 530 performs OFDM modulation on a respective transmit symbol stream and provides a stream of samples to an associated transmitter unit (TMTR) 532. Each transmitter unit 532 processes (e.g., converts to analog, amplifies, filters, and frequency upconverts) its sample stream to generate a modulated signal. Transmitter units 532*a* through 532*t* provide T modulated signals for transmission from T antennas 534*a* through 534*t*, respectively.

At receiving entity 550, R antennas 552*a* through 552*r* receive the T transmitted signals, and each antenna 552 provides a received signal to a respective receiver unit (RCVR) 554. Each receiver unit 554 processes its received signal and provides a corresponding sample stream to an associated OFDM demodulator (Demod) 560. Each OFDM demodulator 560 performs OFDM demodulation on its sample stream and provides received data symbols to a receive (RX) spatial processor 570 and received pilot symbols to a channel estimator 584 within a controller 580. Channel estimator 584 derives channel response estimates for the MIMO channel between transmitting entity 510 and receiving entity 550 for subbands used for data transmission. The channel response estimates may be derived with the base pilot and/or the additional pilot sent by transmitting entity 510. Controller 580 also derives spatial filter matrices based on the MIMO channel response estimates. RX spatial processor 570 performs receiver spatial processing (or spatial matched filtering) on the received data symbols for each subband with the spatial filter matrix derived for that subband and provides detected data symbols for the subband. Each detected data symbol is an estimate of a data symbol sent by transmitting entity 510. An RX data processor 572 then processes the detected data symbols for all subbands and provides decoded data.

Controllers 540 and 580 control the operation of the processing units at transmitting entity 510 and receiving entity 550, respectively. Memory units 542 and 582 store data and/or program codes used by controllers 540 and 580, respectively.

Figure 6:
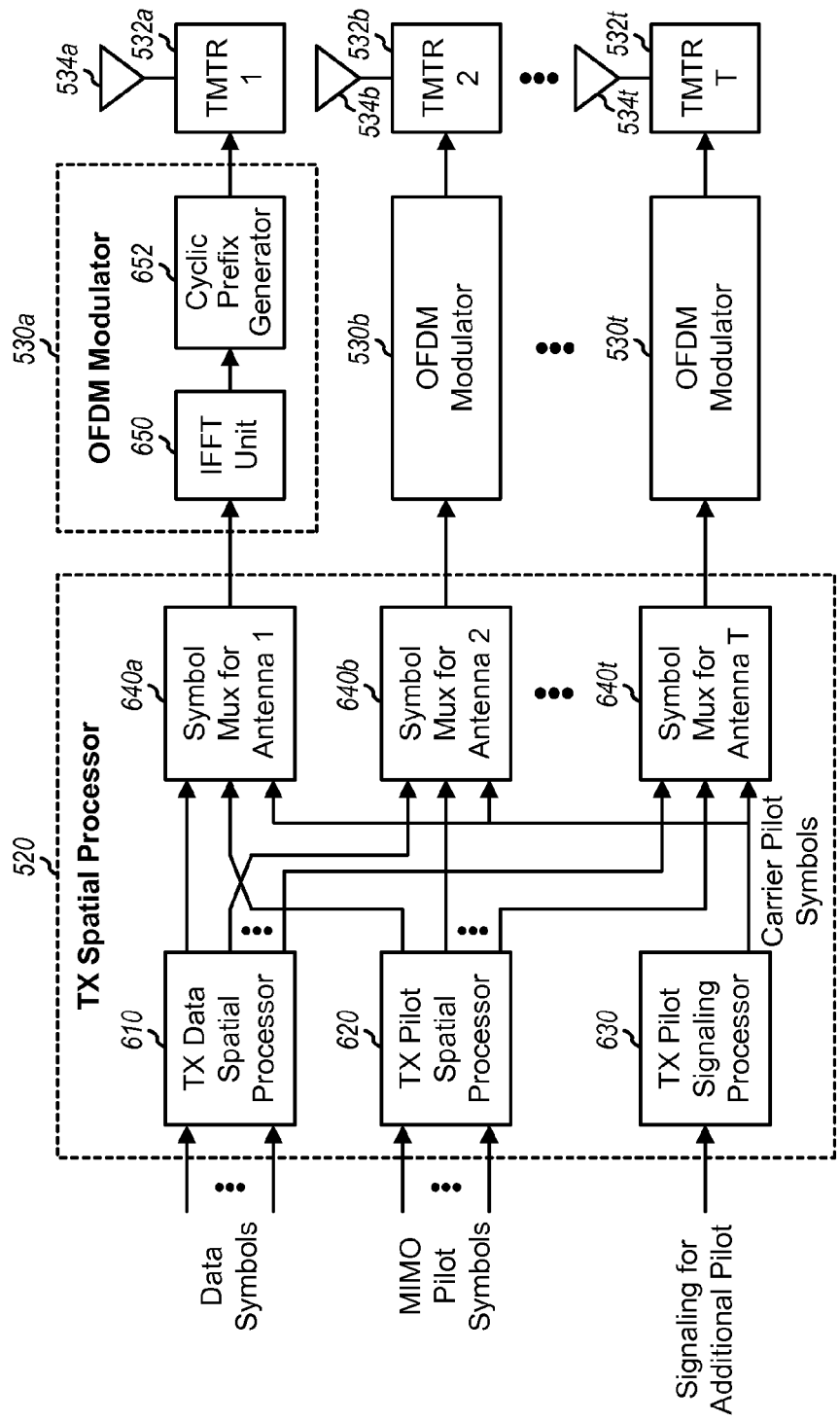
FIG. 6 shows a block diagram of a transmit (TX) spatial processor.

FIG. 6 shows a block diagram of an embodiment of TX spatial processor 520 at transmitting entity 510. Within processor 520, a TX data spatial processor 610 receives and performs spatial processing on the data symbols for transmission via the T transmit antennas or the S eigenmodes of each data subband. TX data spatial processor 610 provides T streams of spatially processed data symbols for the T transmit antennas to T symbol multiplexers (Mux) 640*a* through 640*t*. A TX pilot spatial processor 620 performs spatial processing on pilot symbols and provides (1) an unsteered MIMO pilot for transmission from the T transmit antennas or (2) a steered MIMO pilot for transmission on up to S eigenmodes of each subband used for pilot transmission. TX pilot spatial processor 620 provides spatially processed pilot symbols for the T transmit antennas to T symbol multiplexers 640*a* through 640*t*.

A TX pilot signaling processor 630 generates signaling for the additional pilot, if any, being sent. For the embodiment shown in FIG. 6, the signaling for the additional pilot is embedded within the pilot symbols sent on the four pilot subbands for the carrier pilot. TX pilot signaling processor 630 provides carrier pilot symbols, with the signaling embedded therein, to symbol multiplexers 640*a* through 640*t*. Each symbol multiplexer 640 receives and multiplexes the spatially processed data symbols, the spatially processed pilot symbols, and the carrier pilot symbols for its transmit antenna onto the proper subband and symbol period. T symbol multiplexers 640*a* through 640*t* provide T streams for transmit symbols for the T transmit antennas to T OFDM modulators 530*a* through 530*t*.

Each OFDM modulator 530 performs OFDM modulation on a respective transmit symbol stream and provides a corresponding OFDM symbol stream. For each symbol period, each OFDM modulator 530 obtains K frequency-domain values, e.g., for 48 data and/or pilot symbols to be sent on the 48 data subbands, four carrier pilot symbols to be sent on the four pilot subbands, and 12 signal values of zero for the 12 unused subbands. An inverse fast Fourier transform (IFFT) unit 650 transforms the K frequency-domain values to the time domain with a K-point IFFT and provides a "transformed" symbol that contains K time-domain chips. To combat intersymbol interference (ISI), which is caused by frequency selective fading, a cyclic prefix generator 652 repeats a portion of each transformed symbol to form a corresponding OFDM symbol. The repeated portion is often called a cyclic prefix or guard interval. An OFDM symbol period (or simply, a symbol period) is the duration of one OFDM symbol.

Figure 7:
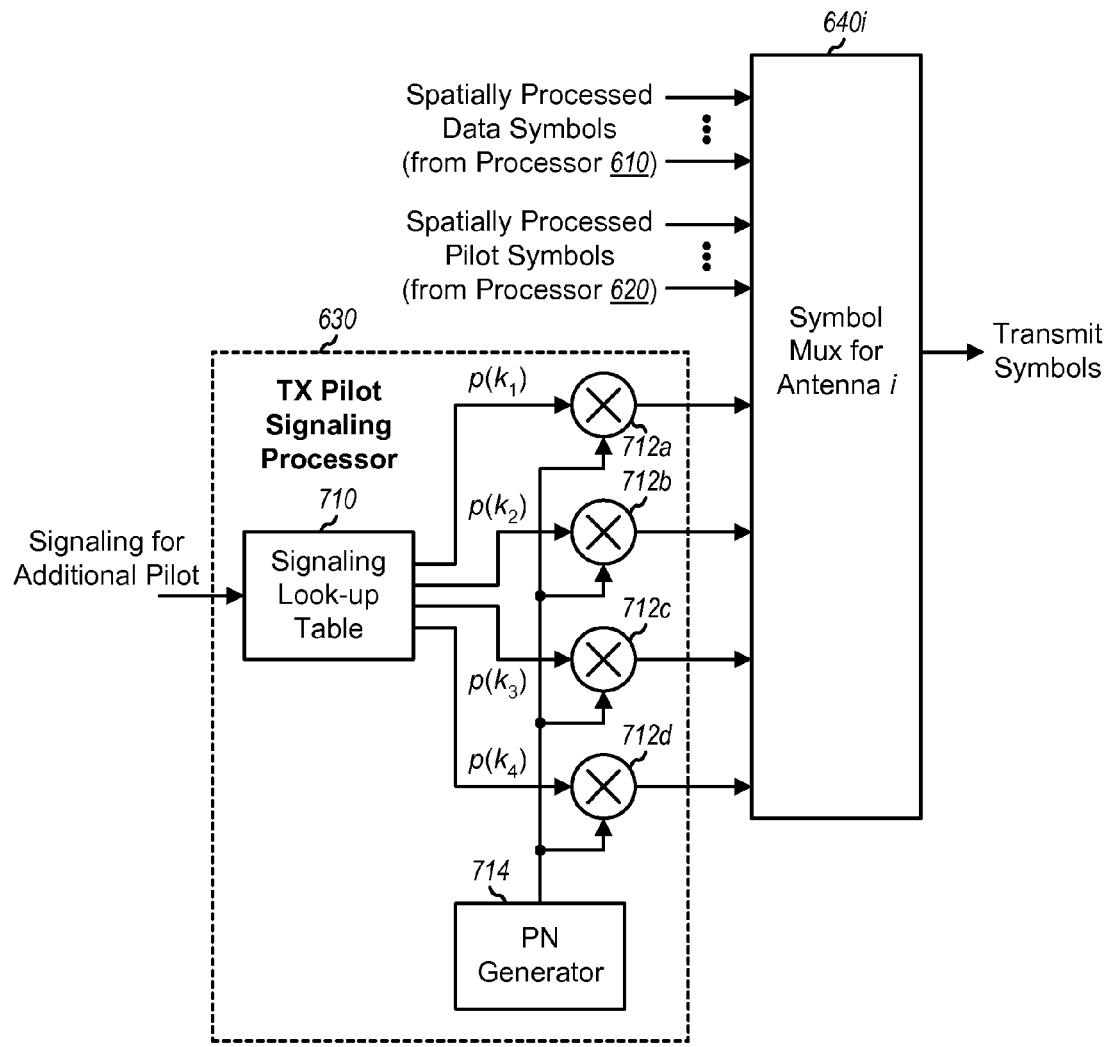
FIG. 7 shows a block diagram of a TX pilot signaling processor.

FIG. 7 shows a block diagram of an embodiment of TX pilot signaling processor 630. Controller 540 provides a signaling value for the additional pilot to a signaling look-up table (LUT) 710, which then provides four pilot symbols corresponding to this signaling value to four multipliers 712*a* through 712*d*. Each multiplier 712 also receive a PN sequence from a PN generator 714 and, for each symbol period, multiplies the pilot symbol for that symbol period with the PN value for that symbol period to generate a scrambled pilot symbol. Multipliers 712*a* through 712*d* provide four scrambled pilot symbols for the four pilot subbands to T symbol multiplexers 640*a* through 640*t*. Each symbol multiplexer 640*i*, for i=1 . . . T, multiplexes the scrambled pilot symbols onto the four pilot subbands used for the carrier pilot and further multiplexes spatially processed data and pilot symbols for transmit antenna i onto the data subbands.

The pilot transmission and signaling techniques described herein may be implemented by various means. For example, these techniques may be implemented in hardware, software, or a combination thereof. For a hardware implementation, the processing units used to transmit additional pilot and signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to receive the additional pilot and signaling may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory units 542 and/or 582 in FIG. 5) and executed by a processor (e.g., controller 540 and/or 580 in FIG. 5). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting pilots in a multiple-input multiple-output (MIMO) communication system, comprising:
transmitting in each protocol data unit (PDU) a first pilot suitable for deriving an estimate of a response of a MIMO channel between a transmitting entity and a receiving entity;
adaptively transmitting in each PDU an additional pilot suitable for deriving an improved estimate of the MIMO channel response;
determining whether to transmit the additional pilot based on one or more factors including condition of the MIMO channel; and
transmitting signaling to indicate the additional pilot being transmitted, wherein the signaling for the additional pilot is transmitted concurrently with the additional pilot, wherein the additional pilot is sent on a first set of frequency subbands in a symbol period selected for additional pilot transmission, and wherein the signaling is sent on a second set of frequency subbands in the symbol period.

2. The method of claim 1, wherein the second set of frequency subbands is for a carrier pilot suitable for tracking a phase of a carrier signal used by the transmitting entity.

3. The method of claim 1, wherein the first pilot and the additional pilot are unsteered MIMO pilots sent from a plurality of antennas at the transmitting entity and without spatial processing by the transmitting entity.

4. The method of claim 1, wherein the first pilot and the additional pilot are steered MIMO pilots sent on orthogonal spatial channels of the MIMO channel.

5. The method of claim 1, wherein the additional pilot is sent on a subset of subbands usable for data transmission.

6. The method of claim 1, wherein each PDU spans a plurality of symbol periods designated for data transmission, and wherein the additional pilot is selectively transmitted in each of the plurality of symbol periods.

7. The method of claim 1, wherein the MIMO system utilizes orthogonal frequency division multiplexing (OFDM).

8. An apparatus in a multiple-input multiple-output (MIMO) communication system, comprising:

a transmitter unit to transmit in each protocol data unit (PDU) a first pilot suitable for deriving an estimate of a response of a MIMO channel between a transmitting entity and a receiving entity, to adaptively transmit in each PDU an additional pilot suitable for deriving an improved estimate of the MIMO channel response, to determine whether to transmit the additional pilot based on one or more factors including condition of the MIMO channel, and transmit signaling to indicate the additional pilot being transmitted, wherein the signaling for the additional pilot is transmitted concurrently with the additional pilot, wherein the additional pilot is sent on a first set of frequency subbands in a symbol period selected for additional pilot transmission, and wherein the signaling is sent on a second set of frequency subbands in the symbol period; and a controller to direct selective transmission of the additional pilot in each PDU.

9. The apparatus of claim 8, wherein each PDU spans a plurality of symbol periods designated for data transmission, and wherein the additional pilot is selectively transmitted in each of the plurality of symbol periods.

10. An apparatus in a multiple-input multiple-output (MIMO) communication system, comprising:

means for transmitting in each protocol data unit (PDU) a first pilot suitable for deriving an estimate of a response of a MIMO channel between a transmitting entity and a receiving entity;

means for adaptively transmitting in each PDU an additional pilot suitable for deriving an improved estimate of the MIMO channel response;

means for determining whether to transmit the additional pilot based on one or more factors including condition of the MIMO channel; and means for transmitting signaling to indicate the additional pilot being transmitted, wherein the signaling for the additional pilot is transmitted concurrently with the additional pilot, wherein the additional pilot is sent on a first set of frequency subbands in a symbol period selected for additional pilot transmission, and wherein the signaling is sent on a second set of frequency subbands in the symbol period.

11. The apparatus of claim 10, wherein each PDU spans a plurality of symbol periods designated for data transmission, and wherein the additional pilot is selectively transmitted in each of the plurality of symbol periods.

12. A method of receiving pilots in a multiple-input multiple-output (MIMO) communication system, comprising:

receiving a first pilot transmitted in each protocol data unit (PDU) and suitable for deriving an estimate of a response of a MIMO channel between a transmitting entity and a receiving entity;

receiving an additional pilot adaptively transmitted in each PDU and suitable for deriving an improved estimate of the MIMO channel response, wherein the transmitting entity determines whether to transmit the additional pilot based on one or more factors including condition on the MIMO channel; and receiving signaling to indicate whether the additional pilot is being transmitted in each PDU, wherein the signaling for the additional pilot is transmitted concurrently with the additional pilot and wherein the signaling is received on a first set of frequency subbands and the additional pilot is received on a second set of frequency subbands.

13. The method of claim 12, wherein each PDU spans a plurality of symbol periods designated for data transmission, and wherein the additional pilot is selectively transmitted in each of the plurality of symbol periods.

14. The method of claim 12, wherein the first pilot and the additional pilot are unsteered MIMO pilots sent from a plurality of antennas at the transmitting entity and without spatial processing by the transmitting entity.

15. The method of claim 12, wherein the first pilot and the additional pilot are steered MIMO pilots sent on orthogonal spatial channels of the MIMO channel.

16. An apparatus in a multiple-input multiple-output (MIMO) communication system, comprising:

a receiver unit to receive a first pilot transmitted in each protocol data unit (PDU) and suitable for deriving an estimate of a response of a MIMO channel between a transmitting entity and a receiving entity and to receive an additional pilot adaptively transmitted in each PDU and suitable for deriving an improved estimate of the MIMO channel response, wherein the transmitting entity determines whether to transmit the additional pilot based on one or more factors including condition of the MIMO channel, and to receive signaling to indicate whether the additional pilot is being transmitted in each PDU, wherein the signaling for the additional pilot is transmitted concurrently with the additional pilot, and wherein the signaling is received on a first set of frequency subbands and the additional pilot is received on a second set of frequency subbands.

17. An apparatus in a multiple-input multiple-output (MIMO) communication system, comprising:

means for receiving a first pilot transmitted in each protocol data unit (PDU) and suitable for deriving an estimate of a response of a MIMO channel between a transmitting entity and a receiving entity;

means for receiving an additional pilot adaptively transmitted in each PDU and suitable for deriving an improved estimate of the MIMO channel response, wherein the transmitting entity determines whether to transmit the additional pilot based on one or more factors including condition of the MIMO channel; and means for receiving signaling indicating whether the additional pilot is being transmitted in each PDU, wherein the signaling and the additional pilot are transmitted concurrently, and wherein the signaling is received on a first set of frequency subbands and the additional pilot is received on a second set of frequency subbands.

* * * * *